United States Patent [19]
Morgan et al.

[11] 3,753,765
[45] Aug. 21, 1973

[54] CONDUCTIVE CARBON ANTISTATIC BACKING FOR PHOTOGRAPHIC FILM

[75] Inventors: James Gail Morgan, Cranbury; Delmar Francis Schumacher, Freehold, both of N.J.

[73] Assignee: E. I. du Pont de Nemours and Company, Wilmington, Del.

[22] Filed: Sept. 20, 1971

[21] Appl. No.: 182,153

[52] U.S. Cl. ................ 117/76 F, 96/87 A, 117/7, 117/47 A, 117/68, 117/83, 117/145, 117/161 UC, 117/161 UT
[51] Int. Cl. .................... G03c 1/82, C08k 1/16
[58] Field of Search .................. 96/87 A; 117/76 F, 117/138.8 A, 138.8 F, 161 UC, 161 UT

[56] References Cited
UNITED STATES PATENTS

| | | | |
|---|---|---|---|
| 3,222,178 | 12/1965 | Nadeau et al. | 96/87 A X |
| 3,437,484 | 4/1969 | Nadeau | 96/87 A |
| 3,443,950 | 5/1969 | Rawlins | 117/161 UT X |
| 3,607,818 | 9/1971 | Trubisky | 96/87 A X |
| 3,635,855 | 1/1972 | Earhart et al. | 96/87 A X |
| 3,460,945 | 8/1969 | Kolesinki et al. | 117/138.8 F X |
| 3,052,543 | 9/1962 | Bauer et al. | 117/138.8 F X |

*Primary Examiner*—Ralph Husack
*Attorney*—William R. Moser

[57] ABSTRACT

An opaque film element suitable for photographic inverse transfer elements comprising a dimensionally stable hydrophobic macromolecular organic film base containing a sufficient amount of a dispersed black pigment to provide an optical density of at least 8.0 and bearing on one surface a non-tacky anchoring layer of a vinylidene chloride/alkyl acrylate/itaconic acid terpolymer, said layer being coated with an antistatic composition comprising an aqueous dispersion containing a coalescible ternary copolymer of methyl methacrylate/ethyl acrylate/methacrylic acid, finely divided, highly conductive, carbon black and optionally, particles of a polyfluoroethylene resin, the resulting layer having a resistivity of $<10^7$ ohms per square. The opposite surface may have an anchoring layer as described above or may be otherwise treated to receive a colloid receptive layer for diffusion inverse transfer processes or a colloid-silver halide emulsion layer.

10 Claims, No Drawings

CONDUCTIVE CARBON ANTISTATIC BACKING FOR PHOTOGRAPHIC FILM

BACKGROUND OF THE INVENTION

1. Field of the Invention: This invention pertains to organic polymer-carbon black aqueous dispersions as coating compositions for anti-static layers on opaque hydrophobic organic polymer films and to coated films containing such antistatic layers, especially photographic base films particularly suited for black and white and color inverse transfer photographic elements.

2. Description of the Prior Art: It is old in the art to apply from a solution, a plastic coating containing a carbon pigment to a photographic support for the purpose of decreasing the propensity of the support for building up static charges as is shown, for example, in Simmons U.S. Pat. No. 2,327,828. Further it is known to apply directly to a hydrophobic support ternary copolymers consisting of various monomer combinations including a substantial amount of vinylidene chloride (35–96 percent) as taught in Alles et al. U.S. Pat. No. 2,627,088 issued Feb. 3, 1953 and Alles, U.S. Pat. No. 2,779,684 issued Jan. 29, 1957. Fowler et al. U.S. Pat. No. 2,794,742 issued June 4, 1957 teaches the use of a terpolymer having a substantial amount (48–70 parts) of an alkyl acrylate in place of the vinylidene chloride, the alkyl group of which contains from two to 10 carbon atoms. Such ternary polymer compositions may be coated on a polyester film support containing a dye or pigment and the ternary polymer compositions themselves may be colored. In addition, Nadeau et al. U.S. Pat. No. 2,943,937, issued July 5, 1960 suggests coating an oriented (stretched) polyethylene terephthalate film, which has been surface treated with an oxidizing agent and has on one surface thereof a vinylidene chloride terpolymer substratum, with a composition comprising finely divided carbon dispersed in an organic coating solution comprising 50 percent each of methyl methacrylate and methacrylic acid and, in addition, diethylene glycol ether. The resulting film structure is said to have antistatic properties. Thompson et al., U.S. Pat. No. 2,976,168 discloses the application of an alkali-soluble antihalation layer utilizing carbon black as the colorant to a polyester support containing a substratum of a vinylidene chloride terpolymer, said antihalation layer being coated from an aqueous ammoniacal solution of an alkyl acrylate-acrylic acid copolymer. The finely divided carbon black, when incorporated in the copolymer solution in a 1:1 carbon: vehicle ratio, has a resistivity of the order of $0.01 \times 10^{10}$ ohms at an optical density of 0.2 at 550 m$\mu$. Nadeau et al. U.S. Pat. No. 3,222,178 discloses an antihalation-antistatic layer comprising a water insoluble, alkali-soluble resin having finely divided carbon dispersed therein. The resins include copolymers of alkyl methacrylate and methacrylic acid in amounts of 30 percent to 60 percent by weight of methacrylic acid and 70 percent to 40 percent by weight of the alkyl methacrylate. The alkyl group may be any alkyl group containing one-four carbon atoms. The amount of carbon black employed in the layers can vary from 0.25 to 0.67 part by weight based on the weight of the resin employed. The compositions are applied from organic solvent solutions directly on the surface of a support which may be a polyester film.

While many of the above structures fulfill the requirements desired for conventional photographic black and white and color film elements insofar as antistatic and anchoring properties are concerned, they are deficient in some of the necessary characteristics when the antistatic layers are applied to an opaque hydrophobic macromolecular organic film base used for inverse transfer photographic film elements. Such elements require better antistatic protection at all relative humidities than that provided by the compositions described in the prior art set forth above. This is because many of the compositions, when coated from solutions, give layers wherein the carbon particles are encapsulated in the polymer and therefore cannot properly conduct static charges. In addition the prior art compositions do not provide the necessary laminating, antifriction and non-blocking characteristics required by certain specific photographic inverse transfer films which become part of multilayer assemblies and are used in cameras which deliver a direct print of a subject. In these and other respects the novel coated films of the invention provide an advantage over the prior art.

SUMMARY OF THE INVENTION

The invention relates to a polymeric film having adhered thereto a layer of an antistatic composition coated on said film from an aqueous dispersion of:

a. a binder comprising a terpolymer of the following composition:
 1. 50 to 66 percent by weight of methyl methacrylate
 2. 29 to 45 percent by weight of ethyl acrylate
 3. about 5 percent by weight methacrylic acid, b. a coalescing agent and c. from 0.25 to 0.50 part by weight of carbon black per part of said terpolymer binder, said carbon black being added as an aqueous dispersion. The terpolymer dispersion may also contain from 0 to 1.0 percent based on the weight of the terpolymer binder of a dispersed trifluroethylene or a tetrafluoroethylene polymer.

The novel coated films of the invention are useful as photographic film supports. They are particularly useful in inverse transfer systems and may be used in black and white and color diffusion transfer elements such as described in U.S. Pat. No. 2,647,055 and U.S. Pat. No. 2,647,049. The films of the invention have excellent antistatic, non-blocking, and frictional characteristics for use as backing films in photographic elements.

DESCRIPTION OF PREFERRED EMBODIMENTS

The novel coated films of the invention may employ any conventional plastic as the polymeric film. For example cellulosic supports, e.g., cellulose acettate, cellulose triacetate, cellulose acetate butyrate, etc., may be used. Polymerized vinyl compounds, e.g., copolymerized vinyl acetate and vinyl chloride, polystyrene, and polymerized acrylates may also be used. The film formed from the polyesterification product of a dicarboxylic acid and a dihydric alcohol made according to the teachings of Alles, U.S. Pat. No. 2,779,684 and the patents referred to in the specification of that patent are eminently successful. Other suitable supports are the polyethylene terephthalate/isophthalates of British Pat. No. 766,290 and Canadian Pat. No. 562,672 and those obtainable by condensing terephthalic acid and dimethyl terephthalate with propylene glycol, diethylene glycol, tetramethylene glycol or cyclohexane dimethanol (hexahydro-p-xylene alcohol). The films of Bauer et al. U.S. Pat. No. 3,052,543, Sept. 4, 1962, may be used. The above polyester films are particularly suitable because of their dimensional stability. A particularly preferred polymeric film support is biaxially oriented polyethylene terephthalate containing sufficient carbon black to provide an optical density of at least 8.0. The polymeric film may be treated, e.g., electrostatically or flame treated, to increase the adhesion of the antistatic layer thereto. Preferably, a polymeric anchor layer to which the antistatic composition has good adhesion is employed.

An anchor layer may be coated on either or both sides of the polymeric film. Copolymers containing at least 21 percent, and preferably at least 35 percent, by weight of the vinylidene chloride have been found particularly advantageous for use in the anchor layer, the primary purpose of which is to provide a surface to which the antistatic layer can adhere. Vinylidene chloride copolymers suitable for the anchor layer include the mass polymerized terpolymers described in U.S. Pat. No. 2,627,088 to Alles and the terpolymers of Rawlins, U.S. Pat. No. 3,443,950, which are made by polymerizing an alkyl acrylate, e.g., ethyl acrylate, in an aqueous dispersion of a vinylidene chloride/alkyl acrylate/itaconic acid terpolymer. A preferred terpolymer may be prepared as described in the Rawlins patent by admixing (a) 90 percent to 60 percent by weight of a vinylidene chloride/alkyl acrylate/itaconic acid terpolymer wherein the alkyl group contains one-four carbon atoms and wherein said components are present in the respective amounts by weight of 35–96 percent, 3.5–64.5 percent, and 0.5–25 percent, and (b) 10 to 40 percent by weight of an alkyl acrylate or alkyl methacrylate monomer, wherein the alkyl group contains one–10 carbon atoms, and effecting polymerization while the mixture is in an aqueous dispersion. Appropriate copolymers are also described in U.S. Pat. No. 2,698,240 to Alles and U.S. Pat. No. 2,698,235 to Swindells. Also suitable are the mixtures of vinylidene chloride terpolymers and an alkyl acrylate or alkyl methacrylate as disclosed in Cohen, U.S. Pat. No. 3,460,944 and those polymer compositions obtained by polymerizing an alkyl acrylate in an aqueous dispersion of a vinylidene chloride/alkyl acrylate/-itaconic acid terpolymer as disclosed and claimed in Rawlins, U.S. Pat. No. 3,443,950, and those compositions comprising a mixture sequentially polymerized of vinylidene chloride/-alkyl acrylate/itaconic acid terpolymer, an alkyl acrylate or methacrylate and a crosslinking agent. Suitable polymerization initiators and dispersing agents are described in Alles, U.S. Pat. No. 2,627,088 and in the above-mentioned Rawlins Patent.

The anchor layer is formed by coating a vinylidene chloride copolymer as described above on the surface of the polymeric film. The antistatic layer is then coated on the anchor layer, preferably after biaxial stretching of the film and anchor layer. The opposite side of the film may also be coated with copolymer or both sides may be treated, e.g., flame treated, and then a layer of a colloid diffusion transfer receptive layer or a colloid-silver halide emulsion layer may be coated thereon.

The anchor layer and/or the antistatic layer and other subsequent coatings can be applied to the support film by any method known in the art, e.g., dip or skim coating or coating with rollers. Suitable coating methods are shown in Heilman, U.S. Pat. No. 3,025,820, Wamsley, U.S. Pat. No. 3,038,441, Brandsma et al. U.S. Pat. No. 3,063,868, and Haley, U.S. Pat. No. 3,082,144. Various coating aids and surfactants may be added in the manner known in the art, but must be compatible with the surfactants, if any, already present and not deleterious other applied coatings, e.g., photographic emulsions.

The anchor layer need, in general, only have a thickness which is a fraction of the thickness of the polyester film. Thicknesses of 1 to 5 microns are usually sufficient. When the anchor layer is coated on a polyester film and the same is then biaxially stretched, there is no adverse effect on the adherence of the vinylidene chloride anchor layer to the polyester film base even though the anchor layer is also stretched to a considerable extent.

The antistatic layer is coated on the anchor layer to give a coating weight of, preferably, 7–20 mg/dm$^2$. It is coated from an aqueous dispersion of a. a binder comprising a terpolymer of the following composition
 1. 50–66 percent by weight methyl methacrylate
 2. 29–45 percent by weight ethyl acrylate
 3. about 5 percent by weight methacrylic acid said binder preferably having a softening point of from 70° C. to 80° C., b. a coalescing agent, preferably a glycol ether, in an amount of from 4 to 12 percent based on the weight of the terpolymer, and c. an aqueous dispersion containing 0.25 to 0.50 part by weight of a low resistivity carbon black per part of said terpolymer binder.

The coalescing agent is an agent that will cause the terpolymer binder and carbon black to leave the form of a dispersion, i.e., coalesce, when coated on th polymeric film. Glycol ether coalescing agents have been found to be particularly effective with terpolymer binder dispersions of the type described.

The terpolymer binder for the antistatic layer may be conveniently prepared according to the teachings of British Pat. No. 1,114,133. After the terpolymer is prepared it is dispersed in an aqueous system containing the coalescing agent and to the resulting dispersion that is added an aqueous dispersion of a low resistivity carbon black in finely divided form in an amount of 0.25 to 0.50 part of carbon black per part of terpolymer binder. When the dispersion is coated and dried the resulting layer will have a resistivity of less than $10^7$ ohms per square and preferably less than $10^5$ ohms per square. A suitable carbon black is that sold under the name "Aquablack 15," sold by the Columbian Carbon Company. Antistatic layers formed from the composition described above have a low coefficient of friction of about 0.18 to 0.6 and also have excellent non-blocking characteristics, that the coated film alone does not.

The invention is illustrated by the following examples.

EXAMPLE I

A polyethylene terephthalate film base having a thickness of 0.0035 inch and having a sufficient amount of carbon black having a particular size of 0.05 to 1.0 micron dispersed therein to give an optical density of 9.7 was coated with an aqueous dispersion of a vinylidene chloride/methyl acrylate/itaconic acid terpolymer, the ratio of monomers of which was 90/10/2 by weight respectively and having ethyl acrylate polymerized therein whereby the weight of terpolymer to poly(ethyl acrylate) was 75/25. The terpolymer-polyethyl acrylate dispersion coating was dried and the resulting layer had a coating weight of 3.0–3.5 mg/dm$^2$. The film was then biaxially stretched in the manner described in Alles, U.S. Pat. No. 2,627,088. The biaxially oriented film was then overcoated with an aqueous dispersion consisting of a poly(methyl methacrylate/ethyl acrylate/methacrylic acid) (66/29/5) and containing 10 percent by weight of the terpolymer of ethylene glycol monoethyl ether as a coalescing agent and 0.41 part per part of the terpolymer binder of highly conductive, finely divided carbon black having an average particle size of about 54 millimicrons. The coating was dried at 90° C for 18 seconds giving a measured dry coating weight of 13.4 mg/dm$^2$. The structure was then heat relaxed at 110° C for 129 seconds as described in Alles, U.S. Pat. No. 2,779,684. The surface resistivity of the layer was measured and found to be $8.2 \times 10^4$ ohms per square and the coefficient of friction was 0.66. The film had excellent slip and non-blocking characteristics and had little or no tendency to build up static charges. A film containing only the above anchoring layer and without the above antistatic layer had a resistivity of $1 \times 10^{12}$ ohms per square and tended to build up undesirable static charges. Further, the film had a higher coefficient of friction resulting in poor slip characteristics which caused difficulty in sliding the element through cameras used for inverse transfer direct print photography.

The above heat relaxed film with the antistatic layer may be treated on the uncoated opposite hydrophobic surface of the polyethylene terephthalate film in a variety of manners such as coating said surface with the anchor layer composition described above or by treating the surface chemically or physically. For example, the surface may be treated with an oxidizing agent, e.g., chromic acid or potassium permanganate or by static or flame treating to produce a hydrophilic surface. After such treatment, a gelatin or other colloid layer suitable as a diffusion inverse transfer layer or a gelatino-silver halide emulsion may be coated thereon.

EXAMPLE II

Example I was repeated in every detail except that diethylene glycol monoethyl ether was used in place of ethylene glycol monoethyl ether as the coalescing agent. The surface resistivity of the resulting film gave a measured resistivity of $1.2 \times 10^5$ ohms per square and a coefficient of friction of 0.64. It also showed the other desirable characteristics of the film of Example I.

EXAMPLE III

Example II was repeated in every detail except that a 32–35 percent (weight) aqueous dispersion of a tetrafluoroethylene polymer having a particle size of 0.05 to 0.5 micron was added to the terpolymer dispersion in an amount to provide 0.17 part of the fluoroethylene polymer per part of terpolymer. The dry coating weight was 12.4 mg/dm$^2$. The surface resistivity measured 1.2 to $1.4 \times 10^5$ ohms per square, and the coefficient of friction was 0.32–0.34. The film had excellent quality for use in photographic inverse transfer elements.

EXAMPLE IV

Example II was repeated except that the methyl methacrylate/ethyl acrylate/methacrylic acid terpolymer of the anti-static layer had a monomer ratio of 50/45/5 by weight respectively. The dry coating weight was 15.7 mg/dm$^2$. The surface resistivity of the layer measured $1.52 \times 10^5$ ohms per square, and the co-efficient of friction was 0.73. The resulting film was of suitable quality for photographic inverse transfer elements.

It is an advantage of the present invention that it permits the formation of a highly efficient antistatic layer for a photographic film support and in addition provides other important characteristics. The poly(methyl methacrylate, ethyl acrylate/methacrylic acid) terpolymer is unique in providing a coalesceable film having a low coefficient of friction and non-blocking characteristics which enable sheets of the film elements to easily slide over one another and yet maintain maximum hardness and ability to be laminated to certain resin coated papers. A further advantage resides in the presence of the highly conductive carbon black in a hydrosol which, when coated on the support, forms a coalesceable layer which provides an antistatic layer of low resistivity, resulting in a substantial reduction in the tendency to build up static charges. A further advantage is that the novel combination of highly conductive carbon in a hydrosol of an easily coalesceable film in the ratios taught above provides a highly satisfactory film element having little or no tendency for the carbon to dust or rub off in handling. A still further advantage is the fact that the polymers used in the coatings are readily and economically prepared by conventional processes; and, in addition, the antistatic layers of this invention are non-tacky, allowing for greater convenience in handling the web during manufacture.

EXAMPLE V

A polyethylene terephthalate film base having a thickness of .0035 inch was first biaxially stretched in the manner described in Alles, U.S. Pat. No. 2,627,008, and then flame treated in the manner of Bryan, U.S. Pat. No. 3,145,242, followed by heat relaxing in the manner of the above Alles patent. The biaxially oriented film was then coated with the antistatic composition of Example I and similar anti-static properties as well as frictional and non-blocking characteristics were obtained. In addition, the antistatic composition of this invention adhered as well to said flame treated film as that described in Example I adhered to the anchor layer of that example.

I claim:
1. A polymeric film having adhered thereto a layer of an antistatic composition coated on said film from an aqueous dispersion of
   a. a binder comprising a terpolymer of the following composition
      1. 50 to 66 percent by weight of methylmethacrylate,
      2. 29 to 45 percent by weight of ethyl acrylate
      3. about 5 percent by weight of methacrylic acid
   b. a coalescing amount of a coalescing agent and
   c. from 0.25 to 0.50 part by weight of carbon black per part of binder.
2. A film according to claim 1 wherein the polymer of which the film is made is a polyester and has an optical density of at least 8.

3. A film according to claim 2 having an anchor layer containing a copolymer comprised of at least 21 percent by weight of vinylidene chloride, said layer of antistatic composition being adhered to said anchor layer.

4. A film according to claim 3 wherein the copolymer of the anchor layer is comprised of at least 35 percent by weight of vinylidene chloride.

5. A film according to claim 4 wherein the copolymer of the anchor layer is a sequentially polymerized mixture of
 a. 90 to 60 percent by weight of a vinylidene chloride/-alkyl acrylate/itaconic acid terpolymer wherein the alkyl group contains one-four carbon atmos and wherein the components are present in respective amounts by weight of 35–96 percent, 3.5–64.5 percent and 0.5–25 percent and
 b. 10 to 40 percent by weight of a polymer of an alkyl acrylate or alkyl methacrylate wherein the alkyl group contains 1-10 carbon atoms, formed by addition polymerization in the presence of said terpolymer.

6. A film according to claim 5 wherein said layer of antistatic composition has a coating weight of 7–20 mg/dm$^2$ and a resistivity of less than $10^7$ ohms per square.

7. A film according to claim 6 wherein said coalescing agent is a glycol ether.

8. A film according to claim 7 wherein said glycol ether coalescing agent is ethylene glycol monoethyl ether or diethylene glycol monoethyl ether.

9. A film according to claim 8 wherein said terpolymer binder has a softening point of from 70° C. to 80° C.

10. A film according to claim 1 wherein said dispersion additionally contains up to 1 percent by weight, based on said terpolymer, of polyfluoroethylene resin particles selected from trifluoroethylene and tetrafluoroethylene polymers.

* * * * *